United States Patent
Hsieh

(10) Patent No.: US 11,118,055 B2
(45) Date of Patent: Sep. 14, 2021

(54) PHOSPHORUS-CONTAINING RESIN COMPOSITION AND ARTICLE MADE THEREFROM

(71) Applicant: Elite Material Co., Ltd., Taoyuan (TW)

(72) Inventor: Chen-Yu Hsieh, Taoyuan (TW)

(73) Assignee: ELITE MATERIAL CO., LTD., Taoyuan (TW)

( * ) Notice: Subject to any disclaimer, the term of this patent is extended or adjusted under 35 U.S.C. 154(b) by 123 days.

(21) Appl. No.: 16/537,116

(22) Filed: Aug. 9, 2019

(65) Prior Publication Data

US 2020/0399471 A1 Dec. 24, 2020

(30) Foreign Application Priority Data

Jun. 24, 2019 (TW) ................................. 108121899

(51) Int. Cl.
| | | |
|---|---|---|
| *C08K 5/51* | (2006.01) | |
| *C08L 79/08* | (2006.01) | |
| *C08K 5/00* | (2006.01) | |
| *C08K 3/013* | (2018.01) | |

(52) U.S. Cl.
CPC ............ *C08L 79/08* (2013.01); *C08K 5/0025* (2013.01); *C08K 5/0066* (2013.01); *C08K 5/51* (2013.01); *C08K 3/013* (2018.01)

(58) Field of Classification Search
CPC ......... C08L 79/08; C08K 5/51; C08K 5/0066; C08K 5/0025; C08K 5/013
See application file for complete search history.

(56) References Cited

U.S. PATENT DOCUMENTS

| | | | | |
|---|---|---|---|---|
| 2013/0075138 A1* | 3/2013 | Yu | ............................ | C08K 3/26 |
| | | | | 174/257 |
| 2017/0166729 A1* | 6/2017 | Hu | ........................... | C09D 5/18 |

FOREIGN PATENT DOCUMENTS

| | | | | |
|---|---|---|---|---|
| CN | 105440645 A | 3/2016 | | |
| CN | 105936745 A | 9/2016 | | |
| EP | 3564247 A1 * | 6/2019 | ............. | C09K 21/12 |
| WO | WO-2018124205 A1 * | 7/2018 | ............ | C07F 9/5325 |

* cited by examiner

*Primary Examiner* — Robert S Jones, Jr.
(74) *Attorney, Agent, or Firm* — Muncy, Geissler, Olds & Lowe, P.C.

(57) ABSTRACT

A phosphorus-containing resin composition comprises a first phosphorus-containing compound, a second phosphorus-containing compound and a maleimide resin; wherein the first phosphorus-containing compound comprises a compound of Formula (I), a compound of Formula (II), or a combination thereof, and wherein the second phosphorus-containing compound is different from the first phosphorus-containing compound, and the second phosphorus-containing compound is absent of a group capable of reacting with the maleimide resin.

13 Claims, 1 Drawing Sheet

PHOSPHORUS-CONTAINING RESIN COMPOSITION AND ARTICLE MADE THEREFROM

CROSS-REFERENCE TO RELATED APPLICATION

This application claims the priority benefits of Taiwan Patent Application No. 108121899, filed on Jun. 24, 2019. The entirety the above-mentioned patent application is hereby incorporated by reference herein and made a part of this specification.

BACKGROUND

1. Field of the Disclosure

The present disclosure primarily relates to a phosphorus-containing resin composition and more particularly to a phosphorus-containing resin composition which is useful for preparing a prepreg, a resin film, a laminate or a printed circuit board and which comprises a first phosphorus-containing compound, a second phosphorus-containing compound, and a maleimide resin.

2. Description of Related Art

Existing materials for copper-clad laminates not only require various mechanical properties and electrical properties but also require a certain degree of flame retardancy. Generally, a flame retardant is added to the resin composition to achieve flame retardancy. With the rise of environmental awareness, halogen-free flame retardants (e.g., nitrogen-containing flame retardants or phosphorus-containing flame retardants) have been used gradually in the industry to replace halogen-containing flame retardants (e.g., bromine-containing flame retardants).

However, existing phosphorus-containing flame retardants undesirably affect various mechanical properties and electrical properties of the copper-clad laminate made from the resin composition. To enhance the performance of flame retardants and to achieve desirable flame retardancy with the use of a less amount of flame retardants, given the same phosphorus content, reactive flame retardants may achieve better flame retardancy after being added to the resin composition in contrast to non-reactive flame retardants.

Nevertheless, conventional reactive flame retardants, such as allyl-containing phosphazene compounds, tend to have poor thermal resistance. In order to achieve desirable flame retardancy and thermal resistance, there is a need to provide a resin composition capable of making copper-clad laminates and articles with better flame retardancy and thermal resistance.

SUMMARY

To overcome the problems of prior arts, particularly one or more above-mentioned technical problems facing conventional materials, it is a primary object of the present disclosure to provide a phosphorus-containing resin composition and an article made therefrom which may overcome at least one of the above-mentioned technical problems.

In view of the aforesaid object, the present disclosure provides a phosphorus-containing resin composition, comprising: (A) a first phosphorus-containing compound; (B) a second phosphorus-containing compound; and (C) a maleimide resin; wherein the first phosphorus-containing compound comprises a compound of Formula (I), a compound of Formula (II), or a combination thereof, wherein n1 is 0 or 1; n2 is 0 or 1; and $R_1$ is hydrogen or a $C_1$ to $C_3$ alkyl group; in addition, the second phosphorus-containing compound is different from the first phosphorus-containing compound, and the second phosphorus-containing compound is absent of a group capable of reacting with the maleimide resin.

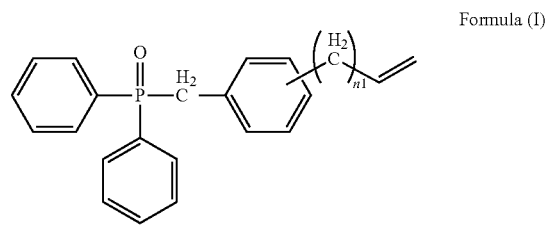

Formula (I)

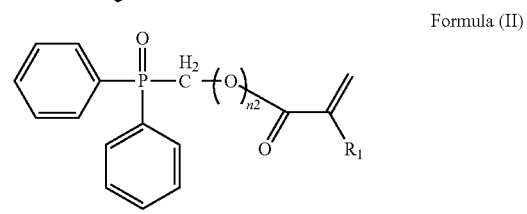

Formula (II)

For example, the compound of Formula (I) may have a structure of Formula (III), but not limited thereto.

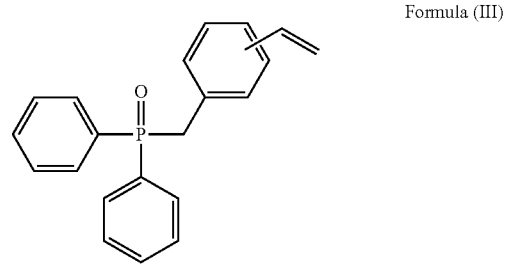

Formula (III)

For example, the compound of Formula (II) may have a structure of Formula (IV), but not limited thereto.

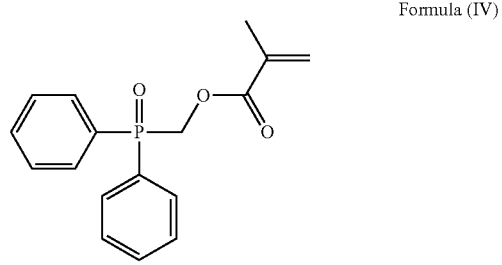 [SMILES: C=C(C)C(=O)OCP(=O)(c1ccccc1)c1ccccc1]

Formula (IV)

In one embodiment, the second phosphorus-containing compound comprises: ammonium polyphosphate, hydroquinone bis-(diphenylphosphate), bisphenol A bis-(diphenylphosphate), tri(chloroisopropyl) phosphate, trimethyl phosphate, dimethyl methylphosphonate, resorcinol bis(dixylenyl phosphate), non-reactive phosphazene compound, non-reactive 9,10-dihydro-9-oxa-10-phosphaphenanthrene-10-oxide (DOPO) compound, non-reactive diphenylphosphine oxide (DPPO) compound, aluminium phosphate, or a combination thereof.

The amount or ratio of each component contained in the phosphorus-containing resin composition is not particularly limited; for example, the phosphorus-containing resin composition may comprise: 20 to 50 parts by weight of the first phosphorus-containing compound; 15 to 35 parts by weight of the second phosphorus-containing compound; and 20 to 30 parts by weight of the maleimide resin.

In addition to the components described above, the phosphorus-containing resin composition may further optionally comprise a vinyl-containing resin, a core-shell rubber, or a combination thereof.

For example, the vinyl-containing resin may comprise a small molecule vinyl-containing compound, a vinyl-terminated polyphenylene ether resin, an allyl-containing compound, an acrylate resin, a polyolefin, or a combination thereof.

In one embodiment, the allyl-containing compound comprises an allyl-modified tetramethylbiphenol, an allyl-containing dicycloisoprene novolac resin, or a combination thereof.

In one embodiment, the polyolefin has an elongation percentage (i.e., elongation rate) of greater than or equal to 500%.

In addition to the components described above, the phosphorus-containing resin composition may further optionally comprise flame retardant, inorganic filler, curing accelerator, solvent, silane coupling agent, coloring agent, or a combination thereof, but not limited thereto.

In various embodiments, the phosphorus-containing resin composition, such as a varnish prepared therefrom, is absent of crystal precipitation after being stored at 0° C. for 7 days.

Moreover, the present disclosure also provides an article made from the phosphorus-containing resin composition described above, which comprises a prepreg, a resin film, a laminate or a printed circuit board.

The article made from the phosphorus-containing resin composition disclosed herein has one, more or all of the following properties:
1. being absent of cracking in a film toughness test;
2. having a T300 thermal resistance as measured by reference to IPC-TM-650 2.4.24.1 of greater than 120 minutes;
3. having a copper foil peeling strength as measured by reference to IPC-TM-650 2.4.8 of greater than or equal to 3.40 lb/in; and
4. having a flame retardancy of V-0 rating as measured by reference to UL94.

DETAILED DESCRIPTION OF EMBODIMENTS

Figure 1:
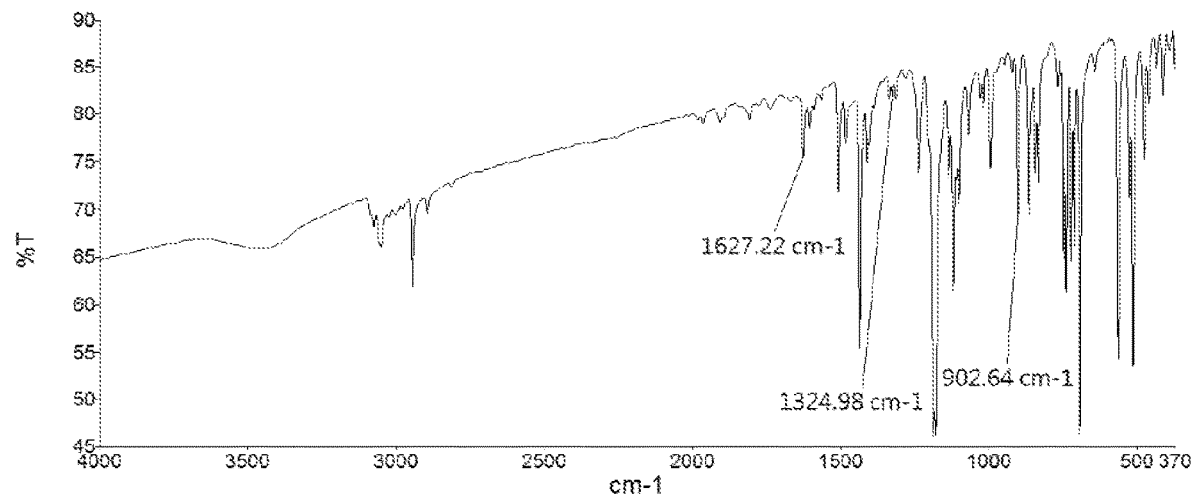
FIG. 1 illustrates the FTIR spectrum of the product made from Preparation Example 1.

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

As used herein, the term "comprises," "comprising," "includes," "including," "has," "having" or any other variant thereof is construed as an open-ended transitional phrase intended to cover a non-exclusive inclusion. For example, a composition or article of manufacture that comprises a list of elements is not necessarily limited to only those elements but may include other elements not expressly listed but inherent to such composition or article of manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "has," "having" or any other variant thereof, it is understood that transitional phrases such as "consisting essentially of" and "consisting of" are also disclosed and included.

In this disclosure, features or conditions presented as a numerical range or a percentage range are merely for convenience and brevity. Therefore, a numerical range or a percentage range should be interpreted as encompassing and specifically disclosing all possible subranges and individual numerals or values therein, particularly all integers therein. For example, a range of "1 to 8" should be understood as explicitly disclosing all subranges such as 1 to 7, 2 to 8, 2 to 6, 3 to 6, 4 to 8, 3 to 8 and so on, particularly all subranges defined by integers, as well as disclosing all individual values such as 1, 2, 3, 4, 5, 6, 7 and 8. Similarly, a range of "between 1 and 8" should be understood as explicitly disclosing all ranges such as 1 to 8, 1 to 7, 2 to 8, 2 to 6, 3 to 6, 4 to 8, 3 to 8 and so on and encompassing the end points of the ranges. Unless otherwise defined, the aforesaid interpretation rule should be applied throughout the present disclosure regardless broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, for example, when X is described as being "selected from a group consisting of $X_1$, $X_2$ and $X_3$" and Y is described as being "selected from a group consisting of $Y_1$, $Y_2$ and $Y_3$," the disclosure shall be interpreted as any combination of X is $X_1$ or $X_2$ or $X_3$ and Y is $Y_1$ or $Y_2$ or $Y_3$.

The following embodiments and examples are illustrative in nature and are not intended to limit the present disclosure and its application. In addition, the present disclosure is not bound by any theory described in the background and summary above or the following embodiments or examples.

As described above, it is a primary object of the present disclosure to provide a phosphorus-containing resin composition, comprising: (A) a first phosphorus-containing compound; (B) a second phosphorus-containing compound; and (C) a maleimide resin; wherein the first phosphorus-containing compound comprises a compound of Formula (I), a compound of Formula (II), or a combination thereof:

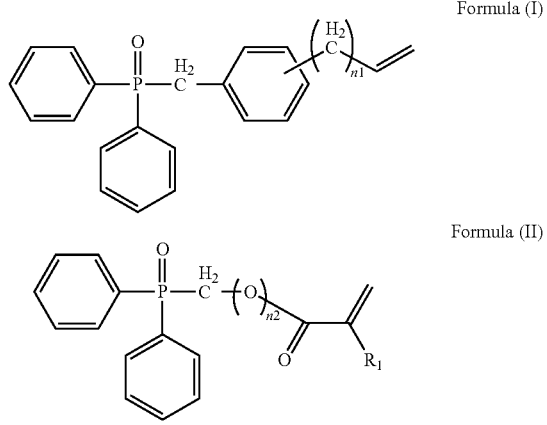

Formula (I)

Formula (II)

wherein n1 is 0 or 1 (if n1 is 0, the group defined by n1 is directly linked to the atoms at two sides by covalent bonds); n2 is 0 or 1 (if n2 is 0, the group defined by n2 is directly linked to the atoms at two sides by covalent bonds); and $R_1$ is hydrogen or a $C_1$ to $C_3$ alkyl group; and wherein the second phosphorus-containing compound is different from the first phosphorus-containing compound, and the second phosphorus-containing compound is absent of a group capable of reacting with the maleimide resin.

In one embodiment, the first phosphorus-containing compound can serve as a reactive phosphorus-containing additive, which has a reactive group capable of reacting (such as but not limited to crosslinking) with other components (such as but not limited to maleimide resin) in the phosphorus-containing resin composition and can serve as a flame retardant to provide the desirable flame retardancy. Therefore, unless otherwise specified, the first phosphorus-containing compound can also be called as the reactive phosphorus-containing compound or the first phosphorus-containing flame retardant.

As used herein, the reactive group of the first phosphorus-containing compound may be an alkenylbenzyl group (such as but not limited to vinylbenzyl, allylbenzyl, etc.) contained in Formula (I) or an acrylate group or an acryloyl group contained in Formula (II), wherein the acrylate group or the acryloyl group may be substituted or non-substituted, i.e., $R_1$ may be hydrogen or a $C_1$ to $C_3$ alkyl group (e.g., methyl, ethyl, n-propyl or i-propyl). In addition, as shown by Formula (I) or Formula (II), the first phosphorus-containing compound contains only one reactive group and therefore can be deemed as a mono-functional reactive phosphorus-containing compound.

Various compounds encompassed by Formula (I) or Formula (II), not limited to those have a structure disclosed herein, are all useful as the first phosphorus-containing compound according to the present disclosure, as long as they belong to the aforesaid mono-functional reactive phosphorus-containing compound and have flame retardancy. In one preferred embodiment, the first phosphorus-containing compound may comprise a compound of Formula (III), a compound of Formula (IV), or a combination thereof:

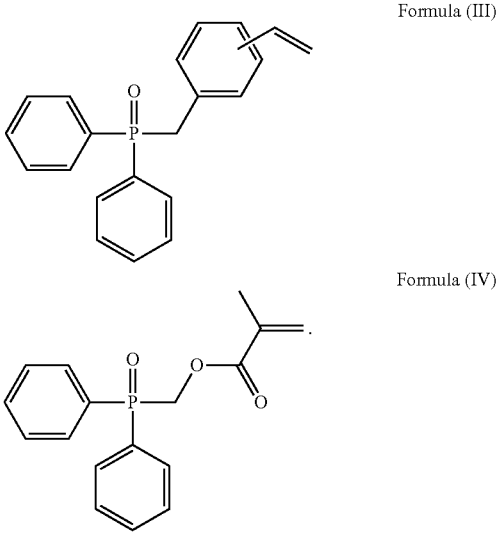

Formula (III)

Formula (IV)

In the present disclosure, the amount of the first phosphorus-containing compound is not particularly limited and may range from 1 part by weight to 100 parts by weight for example. In one preferred embodiment, relative to 20 to 30 parts by weight of the maleimide resin, the phosphorus-containing resin composition according to the present disclosure contains 5 to 80 parts by weight, 10 to 60 parts by weight or 20 to 50 parts by weight of the first phosphorus-containing compound.

On the other hand, in one embodiment, the second phosphorus-containing compound is different from the first phosphorus-containing compound, and the second phosphorus-containing compound does not contain the aforesaid reactive group, such as not containing a group capable of reacting with the maleimide resin. In addition, the second phosphorus-containing compound may also serve as a flame retardant to provide desirable flame retardancy and therefore can be deemed as a second phosphorus-containing flame retardant.

As understood by those skilled in the art, various phosphorus-containing flame retardants not containing a reactive group are all useful as the second phosphorus-containing compound of the present disclosure, examples including but not limited to ammonium polyphosphate, hydroquinone bis-(diphenylphosphate), bisphenol A bis-(diphenylphosphate), tri(chloroisopropyl) phosphate, trimethyl phosphate (TMP), dimethyl methyl phosphonate (DMMP), resorcinol bis(dixylenyl phosphate) (RDXP, such as commercially available PX-200, PX-201, PX-202, etc.), non-reactive phosphazene compound (such as commercially available SPB-100, etc.), non-reactive 9,10-dihydro-9-oxa-10-phosphaphenanthrene-10-oxide (DOPO) compound (including its derivative or resin not containing a reactive group), non-reactive diphenylphosphine oxide (DPPO) compound (including its derivative or resin not containing a reactive group), aluminium phosphate (such as commercially available OP-930, OP-935, etc.) or a combination thereof.

For example, the second phosphorus-containing compound may comprise non-reactive DPPO compounds (such as di-DPPO compounds), non-reactive DOPO compounds (such as di-DOPO compounds) or a combination thereof, but not limited thereto.

In the present disclosure, the amount of the second phosphorus-containing compound is not particularly limited and may range from 1 part by weight to 100 parts by weight for example. In one preferred embodiment, relative to 20 to 30 parts by weight of the maleimide resin, the phosphorus-containing resin composition according to the present disclosure contains 5 to 80 parts by weight, 10 to 55 parts by weight or 15 to 35 parts by weight of the second phosphorus-containing compound.

With the addition of the first phosphorus-containing compound, which is reactive, and the second phosphorus-containing compound, which is not reactive, to the maleimide resin, the phosphorus-containing resin composition according to the present disclosure may achieve one or more advantageous effects, such as less crystal precipitation, excellent film toughness, better T300 thermal resistance, higher copper foil peeling strength, a flame retardancy of V-0 rating, etc., as described in detail below.

Unless otherwise specified, the type of the maleimide resin suitable for the phosphorus-containing resin composition according to the present disclosure is not particularly limited. For example, the maleimide resin may refer to a compound or a mixture containing at least one maleimide group. Unless otherwise specified, the maleimide resin used in the present disclosure is not particularly limited and may include any one or more maleimide resins useful for making a prepreg, a resin film, a laminate or a printed circuit board. Examples include but are not limited to 4,4'-diphenylmethane bismaleimide, oligomer of phenylmethane maleimide (a.k.a. polyphenylmethane maleimide), bismaleimide toluene, diethylbismaleimide toluene, m-phenylene bismaleimide, bisphenol A diphenyl ether bismaleimide, 3,3'-dimethyl-5,5'-diethyl-4,4'-diphenyl methane bismaleimide, 4-methyl-1,3-phenylene bismaleimide, 1,6-bismaleimide-(2,2,4-trimethyl) hexane, N-2,3-xylylmaleimide, N-2,6-xylylmaleimide, N-phenyl maleimide, maleimide compound containing aliphatic long-chain structure, or a combination thereof. In addition, unless otherwise specified, the aforesaid maleimide resin of the present disclosure may comprise a prepolymer thereof, such as a prepolymer of diallyl compound and maleimide compound, a prepolymer of diamine and maleimide compound, a prepolymer of multi-functional amine and maleimide compound or a prepolymer of acid phenol compound and maleimide compound, but not limited thereto.

For example, the maleimide resin may include products such as BMI-1000, BMI-1000H, BMI-1100, BMI-1100H, BMI-2000, BMI-2300, BMI-3000, BMI-3000H, BMI-4000, BMI-4000H, BMI-5000, BMI-5100, BM-7000 and BMI-7000H available from Daiwakasei Co., Ltd., products such as BMI-70 and BMI-80 available from K.I Chemical Industry Co., Ltd., or products such as Compimide MDAB, Compimide TDAB, and Compimide DE-TDAB available from Evonik Industries.

For example, the maleimide resin containing aliphatic long-chain structure may include products such as BMI-689, BMI-1400, BMI-1500, BMI-1700, BMI-2500, BMI-3000, BMI-3000J, BMI-3000G, BMI-3000GE, BMI-5000 and BMI-6000 available from Designer Molecules Inc.

In one embodiment, in addition to the first phosphorus-containing compound, the second phosphorus-containing compound and the maleimide resin, the phosphorus-containing resin composition according to the present disclosure may further optionally comprise a vinyl-containing resin, a core-shell rubber, or a combination thereof.

Unless otherwise specified, the core-shell rubber used herein may include any one or more core-shell rubbers useful for making a prepreg, a resin film, a laminate or a printed circuit board. Examples include but are not limited to any core-shell particle having a hard shell encapsulating a soft core. For example, the polymer forming the core may be a silicone/acrylic polymer, an acrylic polymer, a silicone polymer, a butadiene polymer, an isoprene polymer, etc.; the polymer forming the shell may be poly(methyl methacrylate), polystyrene, etc. For example, the core-shell rubber may include but is not limited to products such as SRK200A, S2100, SX-005, S-2001, S-2006, S-2030, S-2200, SX-006, W-450A, E-901, and C-223A available from Mitsubishi Rayon, products such as AC3816, AC3816N, AC3832, AC4030, AC3364, and IM101 available from Aica Kogyo, products such as MX-217, MX-153, and MX-960 available from Kaneka, and products such as KMP-600, KMP-601, KMP-602, KMP-605, X-52-7030, KMP-590, KMP-701, X-52-854, X-52-1621, KMP-597, KMP-598, KMP-594, X-52-875 available from ShinEtsu. In addition, the core-shell rubber may also include any combination of the aforesaid products.

According to the present disclosure, if the phosphorus-containing resin composition contains the core-shell rubber, the amount of the core-shell rubber is not particularly limited. In one preferred embodiment, relative to 20 to 30 parts by weight of the maleimide resin, the phosphorus-containing resin composition according to the present disclosure contains 0.1 to 10 parts by weight, 0.5 to 10 parts by weight or 1 to 5 parts by weight of the core-shell rubber.

Unless otherwise specified, the phosphorus-containing resin composition according to the present disclosure may optionally further comprise a vinyl-containing resin. If the phosphorus-containing resin composition contains the vinyl-containing resin, the amount of the vinyl-containing resin is not particularly limited. In one preferred embodiment, relative to 20 to 30 parts by weight of the maleimide resin, the phosphorus-containing resin composition according to the present disclosure contains 5 to 200 parts by weight, 5 to 150 parts by weight or 5 to 95 parts by weight of the vinyl-containing resin.

According to the present disclosure, the type of the vinyl-containing resin is not particularly limited and may comprise a small molecule vinyl-containing compound, a vinyl-terminated polyphenylene ether resin, an allyl-containing compound, an acrylate resin, a polyolefin, or a combination thereof.

In one embodiment, the vinyl-containing resin comprises a small molecule vinyl-containing compound. The small molecule vinyl-containing compound as used herein refers to a vinyl-containing compound with a molecular weight of less than or equal to 1,000, preferably between 100 and 900 and more preferably between 100 and 800. According to the present disclosure, the small molecule vinyl-containing compound may include, but not limited to, divinylbenzene (DVB), bis(vinylbenzyl) ether (BVBE), bis(vinylphenyl) ethane (BVPE), 1,2,4-trivinyl cyclohexane (TVCH), or a combination thereof. For example, the small molecule vinyl-containing compound may be added to the phosphorus-containing resin composition in any ratio. For example, relative to 20 to 30 parts by weight of the maleimide resin, the phosphorus-containing resin composition may contain 5 to 100 parts by weight of the small molecule vinyl-containing compound, preferably 5 to 80 parts by weight of the small molecule vinyl-containing compound, and more preferably 5 to 50 parts by weight of the small molecule vinyl-containing compound.

In one embodiment, the vinyl-containing resin comprises a vinyl-terminated polyphenylene ether resin. The vinyl-terminated polyphenylene ether resin is capped by vinyl groups at both ends. Examples of the vinyl-terminated polyphenylene ether resin include but are not limited to vinylbenzyl-terminated polyphenylene ether resin (e.g., OPE-2st available from Mitsubishi Gas Chemical Co., Inc.), methacrylate-terminated polyphenylene ether resin (e.g., SA9000 available from Sabic), vinylbenzyl-modified bisphenol A polyphenylene ether resin, vinyl-containing chain-extended polyphenylene ether resin, or a combination thereof. For example, the vinyl-terminated polyphenylene ether resin may be added to the phosphorus-containing resin composition in any ratio. For example, relative to 20 to 30 parts by weight of the maleimide resin, the phosphorus-containing resin composition may contain 5 to 200 parts by weight of the vinyl-terminated polyphenylene ether resin, preferably 30 to 100 parts by weight of the vinyl-terminated polyphenylene ether resin, and more preferably 50 to 70 parts by weight of the vinyl-terminated polyphenylene ether resin.

In one embodiment, the vinyl-containing resin comprises an allyl-containing compound. The allyl-containing compound is a compound containing an allyl group and is not particularly limited, preferably being an allyl-containing resin having two or more allyl groups per molecule. The allyl-containing resin may also contain other functional groups, such as an epoxy group, a hydroxyl group, etc. Examples of the allyl-containing compound include but are not limited to triallyl isocyanurate (TAIC), triallyl cyanurate (TAC), diallyl bisphenol A, allyl-modified tetramethylbiphenol, an allyl-containing novolac resin, an allyl-containing dicycloisoprene novolac resin, or a combination thereof. Preferably, the allyl-containing compound comprises an allyl-modified tetramethylbiphenol, an allyl-containing dicycloisoprene novolac resin, or a combination thereof. For example, the allyl-containing compound may be added to the phosphorus-containing resin composition in any ratio. For example, relative to 20 to 30 parts by weight of the maleimide resin, the phosphorus-containing resin composition may contain 5 to 20 parts by weight of the allyl-containing compound, preferably 5 to 15 parts by weight of the allyl-containing compound, and more preferably 5 to 10 parts by weight of the allyl-containing compound.

In one embodiment, the vinyl-containing resin comprises an acrylate resin. The acrylate resin may comprise a mono-functional acrylate resin, a bifunctional acrylate resin, or a trifunctional acrylate resin, but not limited thereto. For example, the mono-functional acrylate resin may comprise, but not limited to, dodecyl methacrylate, octadecyl methacrylate, 2-phenoxyethyl methacrylate or a combination thereof. The bifunctional acrylate resin may comprise, but not limited to, tricyclodecane dimethanol diacrylate, 1,6-hexanediol diacrylate, 1,6-hexanediol dimethacrylate, 1,12-dodecanediol dimethacrylate or a combination thereof. The trifunctional acrylate resin may comprise trimethylolpropane trimethacrylate.

For example, the mono-functional acrylate resin may be a mono-functional long-chain alkyl acrylate sold by Sartomer under the tradenames SR313A, SR313B, SR313NS, SR324NS, SR335, and SR489D. For example, the bifunctional acrylate resin may be a bifunctional acrylate sold by Sartomer under the tradenames SR-833S, SR-238NS, SR-239 and SR-262. For example, the trifunctional acrylate resin may be a trifunctional acrylate sold by Sartomer under the tradename SR-350NS.

For example, the acrylate resin may be added to the phosphorus-containing resin composition in any ratio. For example, relative to 20 to 30 parts by weight of the maleimide resin, the phosphorus-containing resin composition may contain 5 to 100 parts by weight of the acrylate resin, preferably 5 to 80 parts by weight of the acrylate resin, and more preferably 5 to 50 parts by weight of the acrylate resin.

In one embodiment, the vinyl-containing resin comprises a polyolefin. Examples of the polyolefin include but are not limited to a polymer containing one or more monomers selected from ethylene, propylene, 1-butene, 1-pentene, 1-hexene, 4-methyl-1-pentene, 1-octene, 1-decene and so on or, or a random polypropylene, ethylene-ethyl acrylate copolymer, etc. Examples include: styrene-butadiene-divinylbenzene terpolymer, styrene-butadiene-maleic anhydride terpolymer, vinyl-polybutadiene-urethane oligomer, styrene-butadiene copolymer, styrene-isoprene copolymer, polybutadiene (homopolymer of butadiene), maleic anhydride-butadiene copolymer, methyl styrene copolymer, styrene-ethylene copolymer, styrene-propylene copolymer, styrene-butadiene-isoprene terpolymer, hydrogenated styrene-butadiene terpolymer, hydrogenated styrene-isoprene copolymer, hydrogenated styrene-butadiene-isoprene terpolymer, or a combination thereof. For example, the polyolefin may comprise, but not limited to, products Ricon 130, Ricon 131, Ricon 134, Ricon 150, Ricon 152, Ricon 153, Ricon 154, Ricon 156, Ricon 157, Ricon 100, Ricon 181, Ricon 184, Ricon 250, Ricon 257, Ricon 130MA8, and Ricon 131MA5 available from Cray Valley, or products D-1117, D-1119, D-1124, D-1128, D-1193, D-4433, D-1101, D-1102, D-1116, D-1118, D-1122, D-1133, D-1144, D-1184, D-4141, D-4150, D-4158, G-1701, G-1702, G-1750, G-1765, G-1780, G-1643, G-1645, G-1650, G-1651, G-1652, G-1654, G-1657, and G-1726 available from Kraton Polymers.

The polyolefin preferably includes a polyolefin with an elongation percentage (elongation %) of greater than or equal to 500%, such as but not limited to D-1117, D-1118, G-1652, G-1701, G-1702, G-1750, G-1765, G-1780, etc. In addition, the polyolefin preferably has an elongation percentage ranging from 500% to 1,500%.

For example, the polyolefin may be added to the phosphorus-containing resin composition in any ratio. For example, relative to 20 to 30 parts by weight of the maleimide resin, the phosphorus-containing resin composition may contain 3 to 100 parts by weight of the polyolefin, preferably 3 to 50 parts by weight of the polyolefin, and more preferably 3 to 30 parts by weight of the polyolefin.

In one embodiment, the phosphorus-containing resin composition according to the present disclosure may optionally further comprise: epoxy resin, amine curing agent, phenol curing agent, anhydride curing agent, benzoxazine resin, cyanate ester resin, or any combination thereof, but not limited thereto.

In addition, the phosphorus-containing resin composition according to the present disclosure may optionally further comprise: flame retardant (which is different from the first phosphorus-containing compound and the second phosphorus-containing compound), inorganic filler, curing accelerator, solvent, silane coupling agent, coloring agent, or a combination thereof.

For example, the flame retardant which is different from the first phosphorus-containing compound and the second phosphorus-containing compound may comprise but is not limited to: tri(2-carboxyethyl) phosphine (TCEP), reactive functional group-containing phosphazene (e.g., SPH-100, SPV-100, etc.), melamine cyanurate, melamine polyphosphate, tri-hydroxy ethyl isocyanurate, DOPO resin (e.g., DOPO-HQ, DOPO-NQ, DOPO-PN, DOPO-BPN, etc.), and DOPO-bonded epoxy resin, wherein DOPO-PN is a DOPO phenol novolac compound, and DOPO-BPN may be a bisphenol novolac compound, such as DOPO-BPAN (DOPO-bisphenol A novolac), DOPO-BPFN (DOPO-bisphenol F novolac) and DOPO-BPSN (DOPO-bisphenol S novolac).

For example, the phosphorus-containing resin composition of the present disclosure may further contain an inorganic filler to enhance the dimensional stability of articles made from the phosphorus-containing resin composition. The inorganic filler may be any inorganic filler known in the field to which this disclosure pertains, examples including but not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, zinc oxide, zirconium oxide, mica, boehmite (AlOOH), calcined talc, talc, silicon nitride, calcined kaolin, or a combination thereof. Moreover, the inorganic filler can be spherical, fibrous, plate-like, particulate, sheet-like or whisker-like in shape and can be optionally pretreated by a silane coupling agent.

For example, the phosphorus-containing resin composition of the present disclosure may further contain a curing accelerator to enhance the reactivity of the components in the phosphorus-containing resin composition. The curing accelerator (including curing initiator) may be any curing accelerator known in the field to which this disclosure pertains, examples including but not limited to catalysts such as a Lewis base, a Lewis acid or a combination thereof. The Lewis base may comprise any one or more of imidazole, boron trifluoride-amine complex, ethyltriphenyl phosphonium chloride, 2-methylimidazole (2MI), 2-phenyl-1H-imidazole (2PZ), 2-ethyl-4-methylimidazole (2E4MI), triphenylphosphine (TPP) and 4-dimethylaminopyridine (DMAP). The Lewis acid may comprise metal salt compounds, such as those of manganese, iron, cobalt, nickel, copper and zinc, such as zinc octanoate or cobalt octanoate. The curing accelerator also includes a curing initiator, such as a peroxide capable of producing free radicals. The curing initiator may comprise dicumyl peroxide, tert-butyl peroxybenzoate, dibenzoyl peroxide, 2,5-dimethyl-2,5-di(tert-butylperoxy)-3-hexyne, bis(tert-butylperoxyisopropyl)benzene or a combination thereof, but not limited thereto.

For example, the phosphorus-containing resin composition of the present disclosure may further contain a solvent to adjust the viscosity of varnish formed therefrom. The solvent may comprise, but not limited to, methanol, ethanol, ethylene glycol monomethyl ether, acetone, butanone (methyl ethyl ketone), methyl isobutyl ketone, cyclohexanone, toluene, xylene, methoxyethyl acetate, ethoxyethyl acetate, propoxyethyl acetate, ethyl acetate, dimethylformamide, dimethylacetamide, propylene glycol methyl ether, or a mixture thereof.

For example, the phosphorus-containing resin composition of the present disclosure may further contain a silane coupling agent to promote dispersion of the inorganic filler. The silane coupling agent may comprise silane (such as but not limited to siloxane) and may be further categorized according to the functional groups into amino silane, epoxide silane, vinyl silane, acrylate silane, methacrylate silane, hydroxyl silane, isocyanate silane, methacryloxy silane and acryloxy silane.

The phosphorus-containing resin composition according to the present disclosure may be processed to make various articles, including but not limited to a prepreg, a resin film, a laminate or a printed circuit board.

For example, the phosphorus-containing resin composition may be used to make a resin film by coating the phosphorus-containing resin composition on a carrier and then heating and baking to semi-cure the phosphorus-containing resin composition. The carrier may comprise a polyethylene terephthalate film (PET film), a polyimide film (PI film), a copper foil or a resin-coated copper (RCC). For example, the phosphorus-containing resin composition may be selectively coated on a polyethylene terephthalate film (PET film), a polyimide film (PI film), a copper foil or a resin-coated copper (RCC), followed by heating and baking to semi-cure the phosphorus-containing resin composition to form the resin film.

For example, the phosphorus-containing resin composition may be used to make a laminate, which comprises two metal foils and an insulation layer disposed between the metal foils, wherein the insulation layer is made by curing the phosphorus-containing resin composition at high temperature and high pressure to the C-stage, a suitable curing temperature being for example between 150° C. and 220° C. and preferably between 190° C. and 210° C. and a suitable curing time being 90 to 180 minutes and preferably 90 to 150 minutes. The insulation layer may be obtained by curing the aforesaid prepreg or resin film. The metal foil may comprise copper, aluminum, nickel, platinum, silver, gold or alloy thereof, such as a copper foil. For example, the laminate may be a copper-clad laminate (CCL).

In addition, the laminate may be further processed by trace formation processes to provide a printed circuit board (a.k.a. circuit board).

Generally, the phosphorus-containing resin composition according to the present disclosure or the article made therefrom may achieve one or more of the following features:

1. The present disclosure chooses a specific first phosphorus-containing compound with a specific second phosphorus-containing compound to be used in a maleimide resin, achieving better T300 thermal resistance (thermal resistance >120 minutes), desirable flame retardancy (V-0) and higher peeling strength (P/S≥3.40) as well.
2. The addition of a polyolefin with greater elongation, e.g., elongation percentage of greater than or equal to 500%, promotes the film toughness.
3. The addition of an allyl-containing dicycloisoprene novolac resin and/or allyl-modified tetramethylbiphenol achieves desirable resin flow and makes a varnish absent of crystal precipitation after being stored at 0° C. for 7 days.

Materials and reagents used in Preparation Examples, Examples and Comparative Examples disclosed herein are listed below:

Reactive Flame Retardant A: vinylbenzyl diphenylphosphine oxide compound (vinylbenzyl-DPPO), synthesized by Applicant (Preparation Example 1).

Reactive Flame Retardant B: methacrylate diphenylphosphine oxide compound (methacrylate-DPPO), synthesized by Applicant (Preparation Example 2).

Reactive Flame Retardant C: allyl diphenylphosphine oxide compound (allyl-DPPO), available from Chin Yee Chemical Co.

Reactive Flame Retardant D: di-vinylbenzyl DPPO-HQ as shown below, synthesized by Applicant (Preparation Example 3).

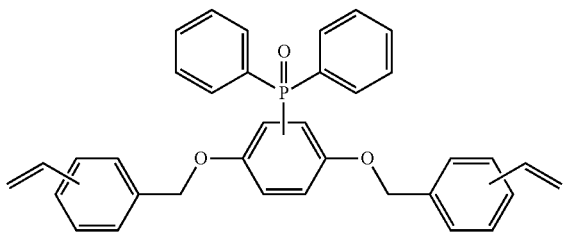

Reactive Flame Retardant E: allyl-containing phosphazene compound, product name SPV-100, available from Otsuka Chemical Co. Ltd.

Reactive Flame Retardant F: diphenyl vinylphosphonate as shown below, synthesized by Applicant.

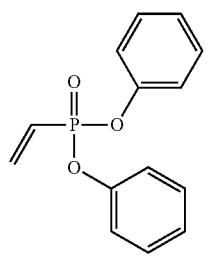 [SMILES: C=CP(=O)(Oc1ccccc1)Oc1ccccc1]

Non-reactive Flame Retardant PX-200: resorcinol bis[di(2,6-dimethylphenyl)phosphate], available from Daihachi Chemical Industry Co., Ltd.

Non-reactive Flame Retardant Di-DOPO: di-DOPO phosphorus-containing high melting point flame retardant, as shown below, synthesized by reference to Chinese Patent Application Publication CN105936745A.

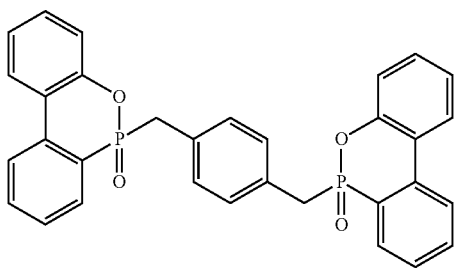 [SMILES: O=P1(Cc2ccc(CP3(=O)Oc4ccccc4-c4ccccc43)cc2)Oc2ccccc2-c2ccccc21]

Non-reactive Flame Retardant Di-DPPO: di-DPPO flame retardant, as shown below, synthesized by reference to Chinese Patent Application Publication CN105440645A.

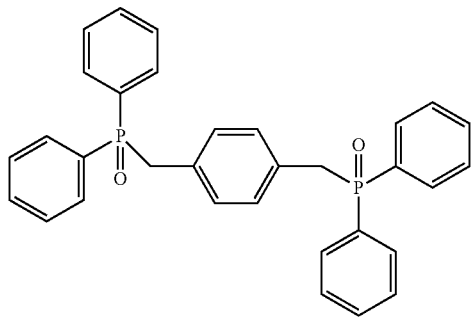 [SMILES: O=P(Cc1ccc(CP(=O)(c2ccccc2)c2ccccc2)cc1)(c1ccccc1)c1ccccc1]

DE-TDAB: diethyl bismaleimidotoluene, available from Evonik Industries.

BMI-1000: 4,4'-diphenylmethane bismaleimide, available from Daiwa Fine Chemicals Co., Ltd.

BMI-70: bis(3-ethyl-5-methyl-4-maleimidophenyl) methane, available from K.I Chemical Industry Co., Ltd.

BMI-2300: phenylmethane maleimide, available from Daiwa Fine Chemicals Co., Ltd.

BMI-1500: maleimide containing aliphatic long chain, available from Designer Molecules Inc.

BMI-1700: maleimide containing aliphatic long chain, available from Designer Molecules Inc.

BMI-3000J: maleimide containing aliphatic long chain, available from Designer Molecules Inc.

BMI-4000: bisphenol A diphenyl ether maleimide, available from Daiwa Fine Chemicals Co., Ltd.

Allyl-268: allyl-containing dicycloisoprene novolac resin, available from Chang Chun Plastics.

8003: allyl-modified tetramethylbiphenol, available from Chin Yee Chemical Co.

SA9000: methacrylate-terminated polyphenylene ether resin, available from Sabic.

Ricon 100: butadiene-styrene copolymer, available from Cray Valley.

Ricon 257: styrene-butadiene-divinylbenzene terpolymer, available from Cray Valley.

D-1118: butadiene-styrene copolymer, elongation percentage greater than 500%, available from Kraton Polymers.

G-1652: styrene-ethylene-butene terpolymer, elongation percentage greater than 500%, available from Kraton Polymers.

D-1117: styrene-isoprene copolymer, elongation percentage greater than 500%, available from Kraton Polymers.

G-1726: styrene-ethylene-butene-styrene tetrapolymer, elongation percentage less than 500%, available from Kraton Polymers.

Perbutyl P: α,α-di(t-butylperoxy)diisopropylbenzene, available from NOF Corporation.

SC-2500 svj: spherical silica, available from Admatechs.

Toluene: available from Chambeco Group.

Preparation Example 1

202.19 g of diphenylphosphine oxide, 126.1 g of formaldehyde, 25.8 g of potassium carbonate and 2.0 L of methanol were added to a 3-liter three-necked flask, heated at 40° C. and stirred for 3 hours. Then the reaction solution was concentrated to obtain 575.3 g of colorless transparent viscous liquid. Then 204.5 g of vinylbenzyl chloride was added and fully stirred, followed by increasing the temperature to 80° C. and carrying out the reaction for 8 hours to obtain the product. The product thus obtained was then purified to obtain white powder solid.

The white powder solid was analyzed by using Fourier transform infrared spectroscopy (FTIR), and the result is shown in FIG. 1. From the measurement result, peaks at 902.64 cm$^{-1}$ and 1627.22 cm$^{-1}$ represent the absorptions of vinyl group (C=C, belonging to the vinylbenzyl group), and peak at 1324.98 cm$^{-1}$ represents the absorption of P=O double bond, indicating that the product synthesized is a vinylbenzyl diphenylphosphine oxide compound (vinylbenzyl-DPPO) having the structure below.

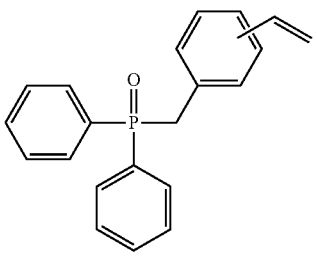

Preparation Example 2

202.19 g of diphenylphosphine oxide, 126.1 g of formaldehyde, 25.8 g of potassium carbonate and 2.0 L of methanol were added to a 3-liter three-necked flask, heated at 40° C. and stirred for 3 hours. Then the reaction solution was concentrated to obtain 575.3 g of colorless transparent viscous liquid. Then 104.5 g of methacryloyl chloride was added and fully stirred, followed by increasing the temperature to 50° C. and carrying out the reaction for 20 hours to obtain the product. The product thus obtained was then purified to obtain white powder solid.

Figure 2:
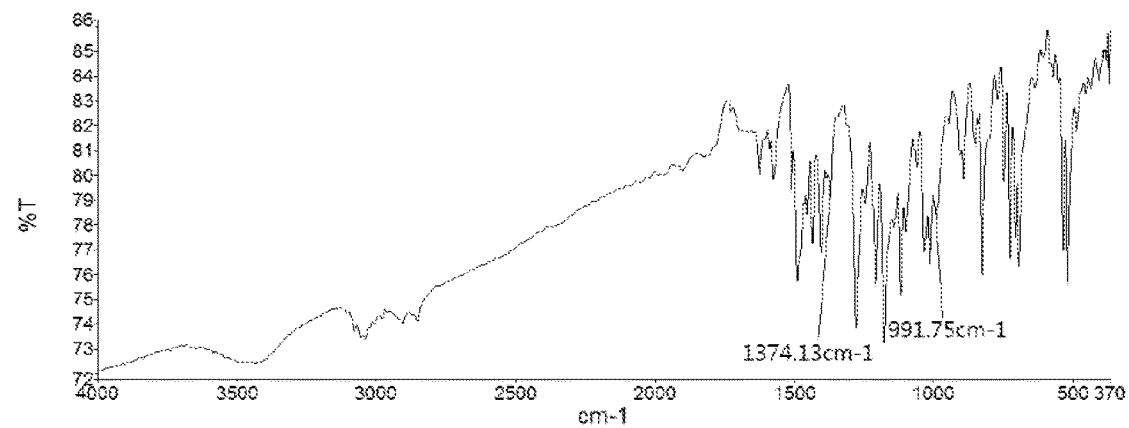
FIG. 2 illustrates the FTIR spectrum of the product made from Preparation Example 2.

The white powder solid was analyzed by using Fourier transform infrared spectroscopy (FTIR), and the result is shown in FIG. 2. From the measurement result, peak at 991.75 cm$^{-1}$ represents the absorption of vinyl group (C=C, belonging to the methacrylate group), and peak at 1374.13 cm$^{-1}$ represents the absorption of P=O double bond, indicating that the product synthesized is a methacrylate diphenylphosphine oxide compound (methacrylate-DPPO) having the structure below.

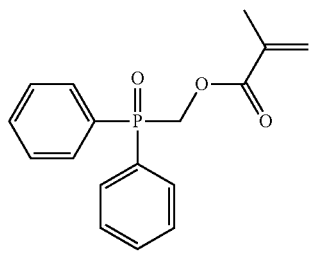 [SMILES: C=C(C)C(=O)OCP(=O)(c1ccccc1)c1ccccc1]

Preparation Example 3

310 g of diphenylphosphinyl hydroquinone (PPQ), 25.8 g of potassium carbonate and 2.0 L of toluene were added to a 3-liter three-necked flask. Then 404.5 g of vinylbenzyl chloride was added and fully stirred, followed by increasing the temperature to 80° C. and carrying out the reaction for 8 hours to obtain the product. The product thus obtained was then purified to obtain white powder solid, which was subject to analysis and confirmed to be di-vinylbenzyl DPPO-HQ.

In addition, samples (specimens) were prepared as described below and tested and analyzed under specified conditions.

Varnish

Resin compositions from different Examples (E1 to E17) and Comparative Examples (C1 to C9) listed in Tables below were respectively added to a stirred tank, well mixed and fully dissolved as varnishes.

Semi-Cured Resin Film (a.k.a. Resin Film)

Each varnish was coated by using a slot die coater (brand name Hirano) on a 38 μm polyethylene terephthalate film (PET film), followed by baking at 80-120° C. (100° C. in average) for 7 minutes to obtain a semi-cured resin film. The semi-cured resin composition layer of the semi-cured resin film has a thickness of 105±2.5 μm. After drying at 80-120° C. (100° C. in average) for 9 minutes, a semi-cured resin film was obtained, which had a thickness of 100 μm, i.e., the thickness of the semi-cured resin composition layer was 100 μm exclusive of the thickness of the PET film.

Copper-Clad Laminate (Prepared by Laminating 100 μm Semi-Cured Resin Films)

Two 18 μm hyper very low profile (HVLP) copper foils and two 100 μm semi-cured resin films made from each resin composition were prepared. A copper foil, two 100 μm semi-cured resin films and a copper foil were superimposed in such order and then subject to a vacuum condition for lamination at 200° C. for 90 minutes to form each copper-clad laminate sample (C-stage).

Copper-Free Laminate (Prepared by Laminating 100 μm Semi-Cured Resin Films)

Each copper-clad laminate was etched to remove the two copper foils to obtain a copper-free laminate with an insulation layer made by laminating two 100 μm semi-cured resin films.

For each sample, test items and test methods are described below.

Film Toughness

The semi-cured resin film (5 cm*5 cm) was used as a sample and wrapped on a round rod ½ inch in diameter. The wrapped semi-cured resin film was observed to determine whether film cracking (cracking range ≥2 mm) existed. If film cracking did not exist, the result of the film toughness test was designated as "OK" to represent passing the test. If film cracking existed, the result of the film toughness test was designated as "NG" to represent failing the test.

In at least one embodiment, the article made from the phosphorus-containing resin composition according to the present disclosure is absent of cracking in the film toughness test.

T300 Thermal Resistance

An EM-526 copper-clad laminate was used as a copper-containing core (available from Elite Material Co., Ltd., using 2116 E-glass fiber fabric and 1-ounce HTE copper foil), which had a thickness of 4 mil. Then the surface copper foil of the copper-containing core was subject to a conventional brown oxidation process to obtain a brown oxide treated core.

The aforesaid brown oxide treated core was sequentially covered on one surface with one 100 μm semi-cured resin film and one 18 μm hyper very low profile (HVLP) copper foil and then subject to vacuum condition for lamination at 200° C. for 1.5 hours to form a copper-clad laminate having the brown oxide treated core as the sample for test. At a constant temperature of 300° C., a thermomechanical analyzer (TMA) was used by reference to IPC-TM-650 2.4.24.1 "Time to Delamination (TMA Method)" to measure the thermal resistance of each sample at 300° C. and record the time to delamination. If no delamination was observed from the sample after 120 minutes, a designation of ">120" was given.

In at least one embodiment, the article made from the phosphorus-containing resin composition according to the present disclosure has a T300 thermal resistance as measured by reference to IPC-TM-650 2.4.24.1 of greater than 120 minutes. For example, the article has a T300 thermal resistance as measured by reference to IPC-TM-650 2.4.24.1 of greater than 120 minutes, 180 minutes, 240 minutes or 300 minutes, but not limited thereto. For example, the article has a T300 thermal resistance as measured by reference to IPC-TM-650 2.4.24.1 of between 120 minutes and 300 minutes.

Resin Flow

By reference to IPC-TM-650 2.3.17.1, a sheet of 40 μm semi-cured resin film and a sheet of copper-clad laminate were prepared and cut to a size of 5 cm*10 cm. The semi-cured resin film was punched by a punching machine to form holes, and the size of punched holes may be referred from the description in IPC-TM-650 2.3.17.1.

A stack of release film/40 μm semi-cured resin film/copper-clad laminate arranged in such order was placed in a laminator for lamination. The laminated film was placed in a fast lamination machine and subject to lamination at a temperature of 170° C. and a pressure of 100 kgf/cm². Then a microscope was used to measure the resin overflow of the sample. Four positions arranged at 90 degrees from each other were chosen from the hole and measured for the resin overflow (in μm), and the average was calculated to represent the test result.

For example, the resin flow is preferably 20 μm to 50 μm. A resin composition with a resin flow of greater than 50 μm is undesirable due to overly high flowability and loss of resin during lamination which will result in insufficient resin content after lamination, such that the resin cannot be finely filled and retained on the circuit boards. In contrast, a resin composition with a resin flow of less than 20 μm is undesirable for the poor resin filling property of resin due to insufficient flowability. In at least one embodiment, the article made from the phosphorus-containing resin composition according to the present disclosure has a resin flow of between 20 μm and 50 μm.

Copper Foil Peeling Strength (Peeling Strength, P/S)

A copper-clad laminate (obtained by laminating two 100 μm semi-cured resin films) was cut into a rectangular specimen with a width of 24 mm and a length of greater than 60 mm, which was then etched to remove surface copper foil and leave a rectangular copper foil with a width of 3.18 mm and a length of greater than 60 mm, so as to prepare a sample required for the IPC-TM-650 2.4.8 test. Next, the sample was tested by using a tensile strength tester by reference to IPC-TM-650 2.4.8 at ambient temperature (about 25° C.) to measure the force (lb/in) required to pull off the copper foil from the insulation layer of the copper-clad laminate. In general, a difference in copper foil peeling strength of greater than 0.3 lb/in represents a significant difference in different laminates.

In at least one embodiment, the article made from the phosphorus-containing resin composition according to the present disclosure has a copper foil peeling strength of greater than or equal to 3.40 lb/in, such as greater than or equal to 3.45 lb/in, greater than or equal to 3.50 lb/in, greater than or equal to 3.55 lb/in, greater than or equal to 3.60 lb/in, greater than or equal to 3.65 lb/in or greater than or equal to 3.70 lb/in. For example, the article has a copper foil peeling strength as measured by reference to IPC-TM-650 2.4.8 of between 3.40 lb/in and 3.70 lb/in.

Glass Transition Temperature (TMA-Tg)

A copper-free laminate (obtained by laminating two 100 μm semi-cured resin films) sample was subject to glass transition temperature measurement by using the thermal mechanical analysis (TMA) method. Each sample was heated from 35° C. to 300° C. at a heating rate of 10° C./minute and then subject to the measurement of glass transition temperature (° C.) by reference to the method described in IPC-TM-650 2.4.24.5, wherein higher glass transition temperature is more preferred.

In at least one embodiment, the article made from the phosphorus-containing resin composition according to the present disclosure has a glass transition temperature of, for example, greater than or equal to 175° C., greater than or equal to 200° C., or greater than or equal to 210° C., such as between 200° C. and 220° C.

Crystal Precipitation of Varnish

The phosphorus-containing resin composition according to the present disclosure was formulated as a varnish and sealed in a sample bottle and stored in a 0° C. refrigerator; after 7 days, the resin composition sample was examined with naked eyes to determine whether crystal precipitation existed. If no crystal precipitation was observed from the resin composition, the 1-week storage crystallinity was designated as "Pass". If crystal precipitation was observed from the resin composition, the 1-week storage crystallinity was designated as "NG".

Flame Retardancy

An EM-526 copper-free laminate was used as a core (available from Elite Material Co., Ltd., using 2116 E-glass fiber fabric and having a thickness of 5 mil). A stack was prepared by overlapping a copper foil (18 μm HVLP copper foil), a 100 μm semi-cured resin film, the core (5 mil), a 100 μm semi-cured resin film, and a copper foil in such order and subject to a vacuum condition for lamination at 200° C. for 1.5 hours to form a copper-containing flame retardancy test sample. The copper-containing flame retardancy test sample was etched to remove the copper foils on both sides to obtain a flame retardancy test sample. In the flame retardancy test, a 8 inch*2 inch flame retardancy test sample was measured in accordance with the UL94 standard to evaluate its flame retardancy rating represented by V-0, V-1, or V-2, wherein V-0 indicates a superior flame retardancy to V-1, V-1 indicates a superior flame retardancy to V-2, and burn-out is the worst.

In at least one embodiment, the article made from the phosphorus-containing resin composition according to the present disclosure has a flame retardancy of V-0 rating as measured by reference to UL94.

Compositions and test results of phosphorus-containing resin compositions of Examples and Comparative Examples are listed below (in part by weight):

TABLE 1

Phosphorus-containing resin compositions of Examples (in part by weight) and test results

| Component | | E1 | E2 | E3 | E4 | E5 | E6 |
|---|---|---|---|---|---|---|---|
| reactive flame retardant | A | 30 | 50 | 20 | | 30 | 30 |
| | B | | | | 30 | | |
| | C | | | | | | |
| | D | | | | | | |
| | E | | | | | | |
| | F | | | | | | |
| non-reactive flame retardant | PX-200 | | | | | | 5 |
| | Di-DOPO | 15 | 15 | 15 | 15 | 35 | 15 |
| | Di-DPPO | | | | | | 10 |
| maleimide resin | DE-TDAB | 10 | 10 | 10 | 10 | 10 | 10 |
| | BMI-1000 | | | | | | |
| | BMI-70 | | | | | | |
| | BMI-2300 | | | | | | |
| | BMI-1500 | | | | | | |
| | BMI-1700 | | | | | | |
| | BMI-3000J | | | | | | |
| | BMI-4000 | 10 | 10 | 10 | 10 | 10 | 10 |
| vinyl-containing resin | Allyl-268 8003 | 5 | 5 | 5 | 5 | 5 | 5 |
| | SA9000 | 50 | 50 | 50 | 50 | 50 | 50 |
| | Ricon 100 | 10 | 10 | 10 | 10 | 10 | 10 |
| | Ricon 257 | | | | | | |
| | D-1118 | 30 | 30 | 30 | 30 | 30 | 30 |
| | G-1652 | | | | | | |
| | D-1117 | | | | | | |
| | G-1726 | | | | | | |
| curing accelerator | Perbutyl P | 0.5 | 0.5 | 0.5 | 0.5 | 0.5 | 0.5 |
| inorganic filler | SC-2500 svj | 80 | 80 | 80 | 80 | 80 | 80 |
| solvent | toluene | 50 | 50 | 50 | 50 | 50 | 50 |
| Property | Unit | E1 | E2 | E3 | E4 | E5 | E6 |
| film toughness | none | OK | OK | OK | OK | OK | OK |
| T300 | minute | >120 | >120 | >120 | >120 | >120 | >120 |
| resin flow | μm | 30.0 | 35.0 | 28.0 | 34.0 | 30.4 | 29.4 |
| peeling strength | lb/in | 3.53 | 3.65 | 3.61 | 3.63 | 3.67 | 3.58 |
| TMA-Tg | °C. | 200 | 205 | 210 | 202 | 204 | 208 |
| crystallinity | none | Pass | Pass | Pass | Pass | Pass | Pass |
| UL-94 | none | V-0 | V-0 | V-0 | V-0 | V-0 | V-0 |

TABLE 2

Phosphorus-containing resin compositions of Examples (in part by weight) and test results

| Component | | E7 | E8 | E9 | E10 | E11 | E12 |
|---|---|---|---|---|---|---|---|
| reactive flame retardant | A | 30 | 30 | 30 | 30 | 30 | 15 |
| | B | | | | | | 15 |
| | C | | | | | | |
| | D | | | | | | |
| | E | | | | | | |
| | F | | | | | | |
| non-reactive flame retardant | PX-200 | | | | | | |
| | Di-DOPO | 15 | 15 | 15 | 15 | 15 | 15 |
| | Di-DPPO | | | | | | |
| maleimide resin | DE-TDAB | 20 | 10 | 10 | 10 | 5 | 5 |
| | BMI-1000 | | | | 10 | 5 | 5 |
| | BMI-70 | | | | | | 5 |
| | BMI-2300 | | | | | | 5 |
| | BMI-1500 | | | | | | |
| | BMI-1700 | | | | | | |
| | BMI-3000J | | | | | | |
| | BMI-4000 | 0 | 10 | 10 | 5 | 10 | 10 |
| vinyl-containing resin | Allyl-268 8003 | 5 | 10 | 5 | 5 | 5 | 5 |
| | SA9000 | 50 | 50 | 50 | 50 | 50 | 70 |
| | Ricon 100 | 10 | 10 | 10 | 10 | 10 | 10 |
| | Ricon 257 | | | | | 6 | |
| | D-1118 | 30 | 30 | | 30 | 30 | 20 |

TABLE 2-continued

Phosphorus-containing resin compositions of Examples (in part by weight) and test results

| | Component | E7 | E8 | E9 | E10 | E11 | E12 |
|---|---|---|---|---|---|---|---|
| | G-1652 | | | 15 | | | 10 |
| | D-1117 | | | 15 | | | |
| | G-1726 | | | | | | |
| curing accelerator | Perbutyl P | 0.5 | 0.5 | 0.5 | 0.5 | 0.5 | 0.5 |
| inorganic filler | SC-2500 svj | 80 | 80 | 80 | 80 | 80 | 80 |
| solvent | toluene | 50 | 50 | 50 | 50 | 50 | 50 |
| Property | Unit | E7 | E8 | E9 | E10 | E11 | E12 |
| film toughness | none | OK | OK | OK | OK | OK | OK |
| T300 | minute | >120 | >120 | >120 | >120 | >120 | >120 |
| resin flow | μm | 31.9 | 27.8 | 33.2 | 29.2 | 28.6 | 29.3 |
| peeling strength | lb/in | 3.61 | 3.50 | 3.53 | 3.50 | 3.50 | 3.52 |
| TMA-Tg | ° C. | 200 | 205 | 201 | 205 | 201 | 211 |
| crystallinity | none | Pass | Pass | Pass | Pass | Pass | Pass |
| UL-94 | none | V-0 | V-0 | V-0 | V-0 | V-0 | V-0 |

TABLE 3

Phosphorus-containing resin compositions of Examples (in part by weight) and test results

| | Component | E13 | E14 | E15 | E16 | E17 |
|---|---|---|---|---|---|---|
| reactive flame retardant | A | 30 | 30 | 30 | 30 | 30 |
| | B | | | | | |
| | C | | | | | |
| | D | | | | | |
| | E | | | | | |
| | F | | | | | |
| non-reactive flame retardant | PX-200 | | | | | 5 |
| | Di-DOPO | 15 | 15 | 15 | 15 | 15 |
| | Di-DPPO | | | | | 10 |
| maleimide resin | DE-TDAB | 15 | 10 | 10 | | 10 |
| | BMI-1000 | 5 | | | | |
| | BMI-70 | | | | 5 | |
| | BMI-2300 | | | | | |
| | BMI-1500 | | | | 5 | |
| | BMI-1700 | | | | 5 | |
| | BMI-3000J | | | | 5 | |
| | BMI-4000 | 10 | 10 | 10 | | 10 |
| vinyl-containing resin | Allyl-268 | 10 | | 5 | 5 | |
| | 8003 | | | | | 5 |
| | SA9000 | 50 | 50 | 50 | 50 | 50 |
| | Ricon 100 | 5 | 10 | 10 | 10 | 10 |
| | Ricon 257 | 3 | | | | |
| | D-1118 | 5 | 30 | | 30 | 30 |
| | G-1652 | | | | | |
| | D-1117 | 15 | | | | |
| | G-1726 | | | 30 | | |
| curing accelerator | Perbutyl P | 0.5 | 0.5 | 0.5 | 0.5 | 0.5 |
| inorganic filler | SC-2500 svj | 80 | 80 | 80 | 80 | 80 |
| solvent | toluene | 50 | 50 | 50 | 50 | 50 |
| Property | Unit | E13 | E14 | E15 | E16 | E17 |
| film toughness | none | OK | OK | NG | OK | OK |
| T300 | minute | >120 | >120 | >120 | >120 | >120 |
| resin flow | μm | 30.8 | 24.9 | 28.2 | 32.9 | 31.4 |
| peeling strength | lb/in | 3.51 | 3.42 | 3.43 | 3.67 | 3.58 |
| TMA-Tg | ° C. | 200 | 215 | 201 | 175 | 213 |
| crystallinity | none | Pass | NG | Pass | Pass | Pass |
| UL-94 | none | V-0 | V-0 | V-0 | V-0 | V-0 |

TABLE 4

Phosphorus-containing resin compositions of Comparative Examples (in part by weight) and test results

| | Component | C1 | C2 | C3 | C4 | C5 |
|---|---|---|---|---|---|---|
| reactive flame retardant | A | | | | | |
| | B | | | | | |
| | C | 30 | | | | |
| | D | | 30 | | | |
| | E | | | 30 | | |
| | F | | | | 30 | |
| non-reactive flame retardant | PX-200 | | | | | |
| | Di-DOPO | 15 | 15 | 15 | 15 | 45 |
| | Di-DPPO | | | | | |
| maleimide resin | DE-TDAB | 10 | 10 | 10 | 10 | 10 |
| | BMI-1000 | | | | | |
| | BMI-70 | | | | | |
| | BMI-2300 | | | | | |
| | BMI-1500 | | | | | |
| | BMI-1700 | | | | | |
| | BMI-3000J | | | | | |
| | BMI-4000 | 10 | 10 | 10 | 10 | 10 |
| vinyl-containing resin | Allyl-268 | 5 | 5 | 5 | 5 | 5 |
| | 8003 | | | | | |
| | SA9000 | 50 | 50 | 50 | 50 | 50 |
| | Ricon 100 | 10 | 10 | 10 | 10 | 10 |
| | Ricon 257 | | | | | |
| | D-1118 | 30 | 30 | 30 | 30 | 30 |
| | G-1652 | | | | | |
| | D-1117 | | | | | |
| | G-1726 | | | | | |
| curing accelerator | Perbutyl P | 0.5 | 0.5 | 0.5 | 0.5 | 0.5 |
| inorganic filler | SC-2500 svj | 80 | 80 | 80 | 80 | 80 |
| solvent | toluene | 50 | 50 | 50 | 50 | 50 |
| Property | Unit | C1 | C2 | C3 | C4 | C5 |
| film toughness | none | OK | OK | NG | NG | NG |
| T300 | minute | 60 | 50 | 55 | 45 | 70 |
| resin flow | μm | 21.2 | 19.4 | 31.0 | 25.0 | 26.9 |
| peeling strength | lb/in | 3.20 | 3.12 | 2.87 | 2.55 | 3.22 |
| TMA-Tg | °C. | 185 | 197 | 178 | 162 | 200 |
| crystallinity | none | NG | NG | Pass | NG | Pass |
| UL-94 | none | V-1 | V-0 | V-1 | burn-out | V-0 |

TABLE 5

Phosphorus-containing resin compositions of Comparative Examples (in part by weight) and test results

| | Component | C6 | C7 | C8 | C9 |
|---|---|---|---|---|---|
| reactive flame retardant | A | 30 | 45 | | |
| | B | | | | |
| | C | | | 45 | |
| | D | | | | |
| | E | | | | |
| | F | | | | 45 |
| non-reactive flame retardant | PX-200 | | | | |
| | Di-DOPO | | | | |
| | Di-DPPO | | | | |
| maleimide resin | DE-TDAB | 10 | 10 | 10 | 10 |
| | BMI-1000 | | | | |
| | BMI-70 | | | | |
| | BMI-2300 | | | | |
| | BMI-1500 | | | | |
| | BMI-1700 | | | | |
| | BMI-3000J | | | | |
| | BMI-4000 | 10 | 10 | 10 | 10 |
| vinyl-containing resin | Allyl-268 | 5 | 5 | 5 | 5 |
| | 8003 | | | | |
| | SA9000 | 50 | 50 | 50 | 50 |
| | Ricon 100 | 10 | 10 | 10 | 10 |
| | Ricon 257 | | | | |
| | D-1118 | 30 | 30 | 30 | 30 |
| | G-1652 | | | | |
| | D-1117 | | | | |
| | G-1726 | | | | |
| curing accelerator | Perbutyl P | 0.5 | 0.5 | 0.5 | 0.5 |
| inorganic filler | SC-2500 svj | 80 | 80 | 80 | 80 |
| solvent | toluene | 50 | 50 | 50 | 50 |
| Property | Unit | C6 | C7 | C8 | C9 |
| film toughness | none | OK | OK | NG | NG |
| T300 | minute | 35 | 65 | 55 | 35 |
| resin flow | μm | 33.2 | 30.9 | 22.1 | 23.9 |
| peeling strength | lb/in | 3.31 | 3.22 | 3.32 | 3.42 |
| TMA-Tg | °C. | 210 | 198 | 190 | 181 |
| crystallinity | none | Pass | Pass | NG | NG |
| UL-94 | none | burn-out | V-0 | V-1 | burn-out |

The following observations can be made according to the test results above.

From the comparison of Examples E1 to E4 with Comparative Examples C1 to C4, in which Examples E1 to E3 use the first phosphorus-containing compound of Formula (I) and Example E4 uses the first phosphorus-containing compound of Formula (II), it can be observed that the copper-clad laminates made from the Examples all achieve a T300 thermal resistance of greater than 120 minutes, have a V-0 flame retardancy and achieve a HVLP copper foil peeling strength of greater than or equal to 3.40 lb/in; in contrast, Comparative Examples C1 to C4 use other reactive flame retardants (wherein C1 uses allyl diphenylphosphine oxide compound, C2 uses vinylbenzyl bifunctional DPPO-HQ, C3 uses allyl-containing phosphazene compound, and C4 uses diphenyl vinylphosphonate) and all fail to achieve the aforesaid effects or properties. In addition, Comparative Example C5 only contains a non-reactive flame retardant and Comparative Examples C6 to C9 only contain a reactive flame retardant and therefore all fail to achieve the aforesaid effects or properties.

From the test results of Comparative Examples C1 to C9, it can be observed that all Comparative Examples fail to achieve a T300 thermal resistance of greater than 120 minutes and fail to achieve at the same time a V-0 flame retardancy and a HVLP copper foil peeling strength of greater than or equal to 3.40 lb/in.

From the comparison of Example E14 and other Examples, it can be observed that other Examples, which contain allyl-containing dicycloisoprene novolac resin (E1 to E13, E15, and E16) or contain allyl-modified tetramethylbiphenol (E17), may achieve a better result in the crystal precipitation test, i.e., no crystal precipitation; in contrast, Example E14 does not contain allyl-containing dicycloisoprene novolac resin or allyl-modified tetramethylbiphenol, and crystal precipitation occurred after the varnish was stored at 0° C. for 7 days.

By comparing Example E15 and other Examples, it can be observed that other Examples contain a polyolefin with an elongation percentage of greater than or equal to 500% and therefore achieve a desirable film toughness (i.e., no cracking in semi-cured resin film); in contrast, Example E15 uses a polyolefin with an elongation percentage of less than 500% and has poor resin film toughness for the existence of film cracking (cracking range ≥2 mm).

The above detailed description is merely illustrative in nature and is not intended to limit the embodiments of the subject matter or the application and use of such embodiments. As used herein, the term "exemplary" means "serving as an example, instance, or illustration." Any implementation described herein as exemplary is not necessarily to be construed as preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and foreseeable equivalents at the time of filing this patent application.

What is claimed is:

1. A phosphorus-containing resin composition, comprising:
   (A) 20 to 50 parts by weight of a first phosphorus-containing compound;
   (B) 15 to 35 parts by weight of a second phosphorus-containing compound; and
   (C) 20 to 30 parts by weight of a maleimide resin;
   wherein the first phosphorus-containing compound comprises a compound of Formula (I), a compound of Formula (II), or a combination thereof:

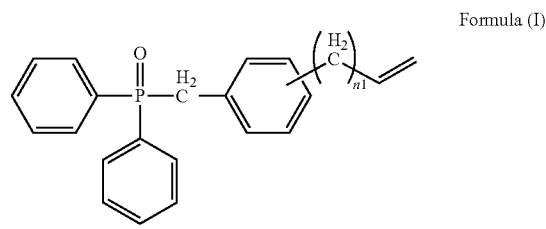

Formula (I)

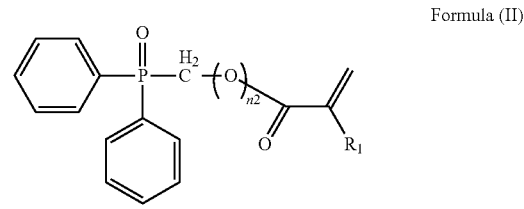

Formula (II)

wherein n1 is 0 or 1; n2 is 0 or 1; and $R_1$ is hydrogen or a $C_1$ to $C_3$ alkyl group;

wherein the second phosphorus-containing compound comprises a compound of Formula (V), a compound of Formula (VI), a compound of Formula (VII) or a combination thereof:

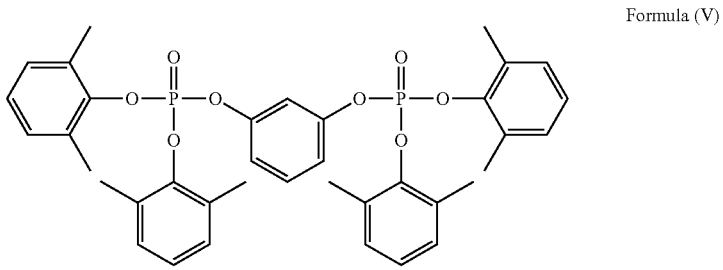

Formula (V)

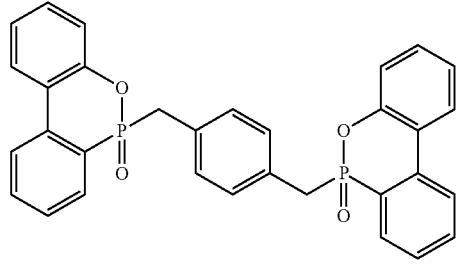

Formula (VI)

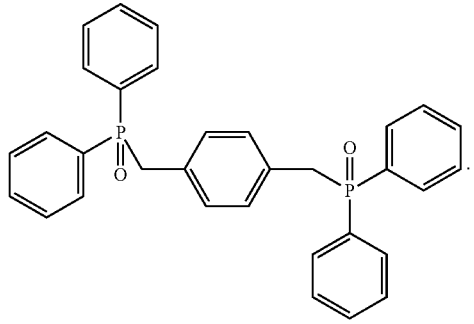

Formula (VII)

2. The phosphorus-containing resin composition of claim 1, wherein the compound of Formula (I) and the compound of Formula (II) respectively have the structures of Formula (III) and Formula (IV):

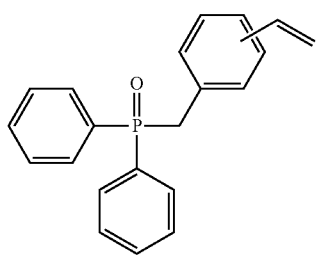

Formula (III)

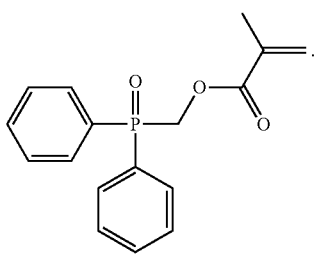

Formula (IV)

3. The phosphorus-containing resin composition of claim 1, further comprising a vinyl-containing resin, a core-shell rubber, or a combination thereof.

4. The phosphorus-containing resin composition of claim 3, wherein the vinyl-containing resin comprises a small molecule vinyl-containing compound, a vinyl-terminated polyphenylene ether resin, an allyl-containing compound, an acrylate resin, a polyolefin, or a combination thereof.

5. The phosphorus-containing resin composition of claim 4, wherein the allyl-containing compound comprises an allyl-modified tetramethylbiphenol, an allyl-containing dicycloisoprene novolac resin, or a combination thereof.

6. The phosphorus-containing resin composition of claim 4, wherein the polyolefin has an elongation percentage of greater than or equal to 500%.

7. The phosphorus-containing resin composition of claim 1, further comprising flame retardant, inorganic filler, curing accelerator, solvent, silane coupling agent, coloring agent, or a combination thereof.

8. The phosphorus-containing resin composition of claim 7, which is absent of crystal precipitation after being stored at 0° C. for 7 days.

9. An article made from the phosphorus-containing resin composition of claim 1, comprising a prepreg, a resin film, a laminate or a printed circuit board.

10. The article of claim 9, characterized by absence of cracking in a film toughness test.

11. The article of claim 9, having a T300 thermal resistance as measured by reference to IPC-TM-650 2.4.24.1 of greater than 120 minutes.

12. The article of claim 9, having a copper foil peeling strength as measured by reference to IPC-TM-650 2.4.8 of greater than or equal to 3.40 lb/in.

13. The article of claim 9, having a flame retardancy of V-0 rating as measured by reference to UL94.

* * * * *